Patented Oct. 9, 1928.

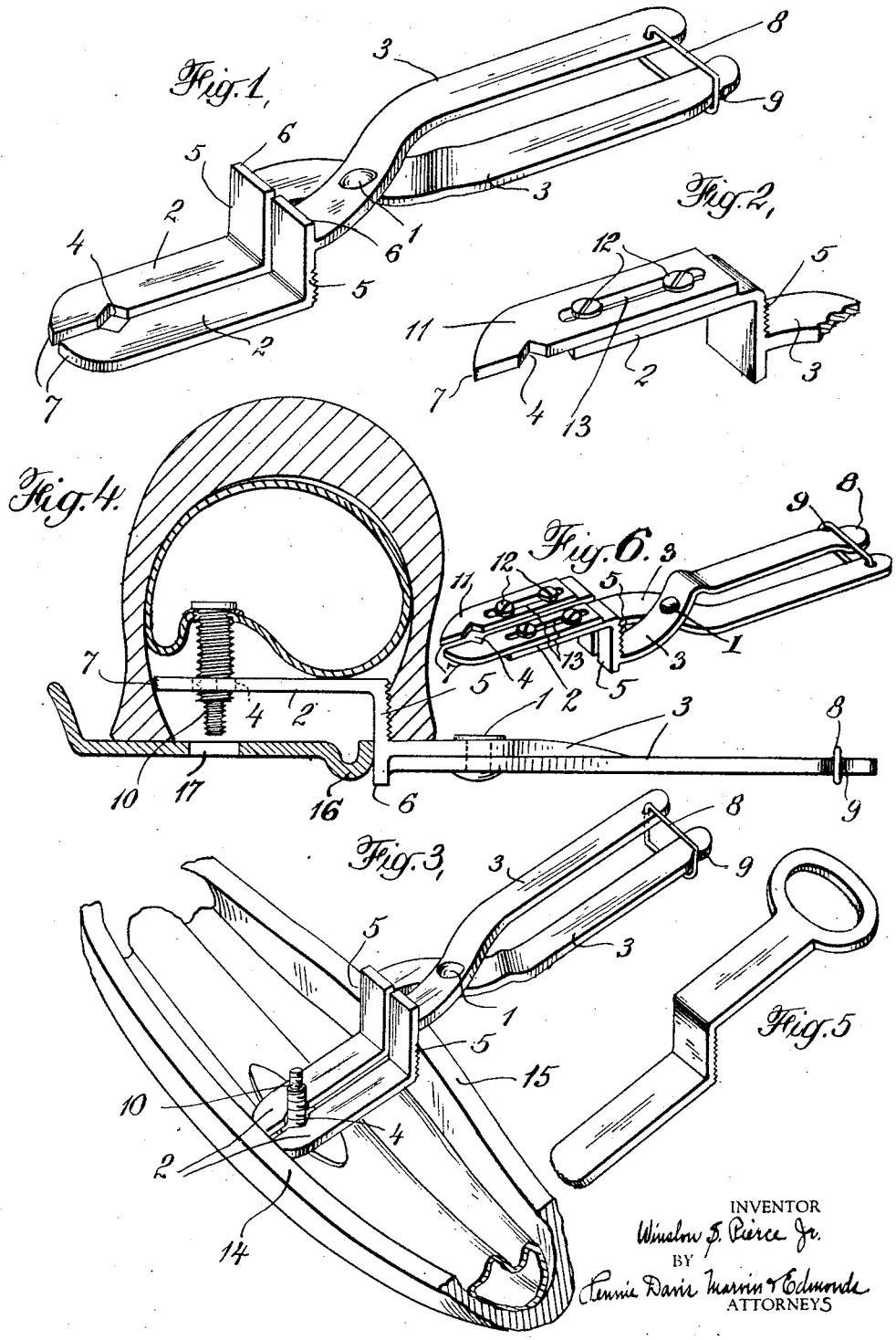

1,686,640

UNITED STATES PATENT OFFICE.

WINSLOW S. PIERCE, JR., OF BAYVILLE, NEW YORK.

TIRE TOOL.

Application filed July 6, 1927. Serial No. 203,706.

This invention relates to tire tools, particularly to tire tools which are used in the putting on and taking off of tires from wheel rims, and has for its object the provision of an improved form of tool for facilitating the changing of tires and eliminating the risk of injuring the tube during the operation.

In the use of non-split straight side rims, the usual procedure when putting on a tire is to insert the valve stem of the tube in the hole in the rim provided for it and apply the portion of the tire adjacent the valve stem to the rim. Since the tire is not parallel to the rim in this position, the portion of the inner bead of the tire diametrically opposite the valve stem must be forced onto the rim because the available diameter of the tire, due to its non-parallel position, is less than the diameter of the rim. The remainder of the outer bead of the tire is then forced onto the rim in a similar manner until the entire tire is in proper position on the rim.

Were it not for the necessity of inserting the valve stem in the hole in the rim it would be possible to hold the tire parallel to the rim and then slip it on bodily. However, since this is not possible the tire must always be pried over the edge of the rim in order to fit it into place. Any tool which may be used to effect this prying action must be sufficiently massive to have the necessary rigidity and permit sufficient leverage action to be applied, and this fact naturally aggravates the difficulty. Furthermore, the tire must be stretched a certain amount during the prying process and with new tires, or tires which are changed infrequently, this is sometimes very difficult to accomplish because the tire beads are quite stiff and have not acquired the elasticity which is possessed by the beads of tires which have been changed frequently.

Difficulties of a different nature, though no less in degree, are present in changing or repairing a tube in the event of a puncture in a clincher tire. The tube cannot very well be withdrawn from or inserted in the tire while the inner bead of the tire is in place on the rim because sufficient space is not present between the tire and the rim to permit the valve stem to be withdrawn from or placed in the hole in the rim except with the utmost difficulty. Therefore it is customary to pry off the entire shoe which is obviously more than twice as difficult to disengage as the outer bead alone. Consequently, it is just as much work, with present day tools to repair a punctured tube as it is to change a complete tire.

To overcome such disadvantages as have been pointed out, I have constructed a tool which in the case of a straight side tire firmly grips the valve stem and holds it in a depressed position so that the tire may be readily slipped on or off of the rim while held parallel to it; and in the case of a clincher tire, enables the easy removal or replacement of the valve stem in the rim hole with only the outer bead disengaged.

Thus, the tool which I have devised may be formed in the general shape of a pair of tongs having offset jaws. The distance from the offset to the nose of the jaws may be such as to spread the tire beads when the tool is inserted, which fact is taken advantage of to promote its ease of manipulation as will be shown later. To hold the valve stem and prevent it from moving while the tire is being changed, the jaws may be formed in such a manner as to surround the valve stem and securely hold it when the handles of the tool are pressed together. A latch or loop may be arranged on one of the handles and adapted to be slipped over the end of the other handle to hold the two together, thereby eliminating the necessity for having them held together by hand.

Furthermore, since tires and rims are of various widths, the jaws of the tire tool, in order to make it applicable to all sizes of rims, should also be of various lengths so as to properly position the valve stem of the tube. To accomplish this variation I may provide an adjustable extension on each jaw which will permit the tool to be used for rims of different widths depending upon how the jaws are set. The tool therefore can be used either for all rims of a particular size, in which case it may well form part of the tool kit of a number of cars using tires of a given size, or it may be used in a general repair shop where it is necessary to change tires of various sizes. Merely by adjusting the length of the jaws the tool can be adapted for all sizes of rims.

A further means of providing this universal characteristic is to make the length of the jaws to suit the widest rim and use a supplementary tool to hold the beads apart, thus providing a space in which the tool may be moved about for the purpose of locating the hole in the rim with the valve stem.

In order to obtain a better understanding of the invention reference is made to the accompanying drawings wherein—

Fig. 1 is a perspective view of a tire tool constructed in accordance with the invention.

Fig. 2 is a perspective view of a modified form of tool jaw.

Fig. 3 is a perspective view showing the manner in which the tool of this invention is applied to a tire.

Fig. 4 is a sectional view of a tire on a rim, showing the location of the tool of the invention with respect to the wheel rim.

Fig. 5 is a perspective view of a supplementary tool which may be used in conjunction with the tool of Fig. 1.

Fig. 6 is a perspective view of a complete tire tool provided with the modified form of tool jaw shown in Fig. 2.

Considering the embodiment shown in the drawings more in detail, the tool of Fig. 1 is composed of two members pivoted at 1 and each having a jaw portion 2 and a handle portion 3. The members pivoted at 1 in a well known manner to provide movement of the members toward and away from each other, and to increase the usefulness of the tool the pivot may be made in the form of a bayonet lock so that the members can be separated and used as prying irons.

Each jaw is provided with a cutout portion 4 adapted to fit around a valve stem. This cutout portion may be square, as shown, or of other form, although I prefer to make it square because a square hole will securely hold valve stems of various sizes in their correct angular relation to the rim in the event bent valve stems are used, as in disc wheels.

At their base, the jaws 2 are bent at substantially right angles to form the shoulders 5 and the projecting lips or edges 6 extending above the point at which the handles 3 may be joined to the shoulders, if desired, to form an abutment. The shoulders 5 and the nose 7 of the jaws may be knurled, as shown, in a suitable manner to prevent side slipping of the tool when it is inserted into a tire. To eliminate the necessity of holding the handles together by hand a ring or latch 8 may be secured to the end of one of the handles and arranged to slip over the end of the other handle to clamp the two together. Several notches 9 may be cut in the one handle to insure a secure locking of the ring.

When it is desired to apply a tire to a rim, the tool is inserted into the tire as shown in Fig. 3. The knurled nose of the jaws is pressed against one bead 14 and the knurled shoulders 5 are pressed in and against the other bead 15. The length of the jaws from the center of the valve stem rim to the shoulders should be such that it will correctly locate the valve stem for the rim hole when the shoulder impinges against the edge of the rim. The jaws are then clamped around the valve stem 10 near its end and the handles locked together by the ring 8.

With the tool secured in this position by reason of the natural tension between the two beads, the tire is held parallel to the rim with the valve stem of the tube in alignment with the valve stem hole in the rim, and then slipped over the rim until the projecting lips 6 of the jaws abut against the edge 16 of the rim as shown in Fig. 4. If the tire has been properly lined up the valve stem will be directly over the hole 17 in the rim provided for it because the distance from the edge 16 of the rim to the hole is equal to the distance from the cutout portion 4 to the shoulders 5, the tool being purposely dimensioned to permit this exact placement. The latch 8 is then released and the jaws opened. The valve stem 10 will then project through the opening 17 a sufficient distance to be grasped by the fingers and can later be pulled out to its full length. If some air is pumped into the tube before the tire is slipped on the rim the valve stem will slip through the opening quite readily.

As soon as the valve stem is pulled through the opening, the tool can be drawn out by a downward and outward movement, and the tire can then be pushed all the way onto the rim and the usual outer locking ring applied to hold the tire in place. The entire operation of putting on a new tire and pushing it into place can be accomplished in far less time and with less labor than it can by any of the prying methods now in use. Furthermore, the tube is at no time subjected to pinching such as it is when applied in the customary manner.

When a tire is to be removed from a rim the procedure outlined above is followed in reverse order. For a straight side rim, the outer locking ring is removed, the tool inserted and clamped about the valve stem and the tire withdrawn from the rim. If only the tube is to be removed, the tire is pulled partially off of the rim and the tube then withdrawn. It thus is not necessary to remove the entire tire in order to repair the tube. For clincher rims this procedure is of particular advantage because it is only necessary to lift the outer bead 15 off of the rim in order to provide space in which the tool can be inserted and clamped around the valve stem and the tube withdrawn. After repairing the tube it is only necessary to force the outside bead back into place on the rim, an operation which is considerably easier than forcing an entire tire into place.

The form of tool shown in Fig. 1 is adapted to be made in various sizes, depending upon the width of rim with which it is to be used. For rims of different widths it is necessary to use different sized tools, or tools having jaws of different lengths. In order that one tool may be used for all widths of rims, as is most convenient and practically essential when the tool is used in a tire repair shop, I have devised the modification shown in Fig. 2.

In this figure, the jaws of the tool are provided with an adjustable extension 11 which can be set by the screws 12 passing through the slot 13 to either lengthen or shorten the jaws. One tool may thus be used for all widths of rims merely by properly setting the jaws to the necessary length. The tool is then capable of being used in the same manner as before.

As was mentioned above, another way of securing this adaptability to different sizes is by the use of a supplementary spreading member as shown in Fig. 5. When this supplementary tool is used the gripping tool is so proportioned that the distance between the center of the valve stem grip and the offset is such that it will be adequate for the widest rim with which it is intended to be used. The distance between the end of the spreading tool and its offset is made somewhat greater than this. Thus it will be readily seen that when the latter is placed between the two beads of the shoe it will hold them apart a sufficient distance to afford the necessary movement of the gripping tool to enable the location of the hole in the rim with the valve stem.

While no particular stress has been laid upon the use of the tool in connection with the split type of rim, which is contracted to a smaller diameter to permit the application of a tire with less difficulty than if the rim were of the usual form, the tool nevertheless facilitates the mounting of a tire even on a rim of this form. Because the tool is adapted to insert the valve stem in the manner I have disclosed, the extent to which the split rim must be contracted may be materially reduced. Then too, as in the use of the tool with rims which are not split, the risk of injuring the tube during the mounting of the tire is entirely eliminated.

Since the tool of Fig. 1 or of Fig. 2 need not be used to apply a leverage action to the tire it can be made of relatively thin section and may be quite conveniently formed of stamped metal sections, thus cheapening the cost of manufacture. The universality of the modification of Fig. 2 makes it particularly adaptable for all uses where tires of various sizes must be changed, and for tires of any given size the form of tool of Fig. 1 is perhaps preferable and can be supplied as part of the usual automobile tool kit at but slight additional cost. The thin, flat section of the handles of the tool makes it possible for them to be used in the same way that prying irons are now used to fit the tire on the rim, particularly in the case of clincher tires where it is necessary to force the outer bead of the tire in place after the tool has aided in inserting the tube valve stem in the hole in the rim. A single tool of the construction which I have disclosed may therefore be used to perform all of the functions necessary to the complete changing of a tire, even to the tightening or loosening of the usual cap nut fitting over the valve stem after it is in place.

While I have shown and described but one embodiment of the invention it is to be understood that various other changes and modifications may be made in the construction of the tool without departing from the scope of the invention as defined by the appended claims.

I claim:

1. A tire tool comprising two members pivoted intermediate their ends, each of said members having a jaw, a shoulder portion extending at an angle from said jaw, and a handle extending from said shoulder portion intermediate the end edge thereof and said jaw.

2. A tire tool comprising two members pivoted intermediate their ends, each of said members having a jaw, a knurled shoulder portion extending at right angles from said jaw, and a handle spaced from said jaw and extending from said shoulder portion, said shoulder portion having a lip projecting beyond said handle.

3. A tire tool comprising two members pivoted intermediate their ends, each of said members having a flat jaw provided with a cutout portion, a knurled shoulder portion extending at right angles from one end of said jaw, and a handle extending from said shoulder portion in a plane parallel to but spaced from said jaw, said shoulder portion having a lip projecting beyond the plane of said handle and at right angles thereto.

4. A tire tool comprising two members pivoted intermediate their ends, each of said members having an extendable jaw, a shoulder portion extending at an angle from said jaw, and a handle extending from said shoulder portion in a plane parallel to but spaced from said jaw, said shoulder portion having a lip projecting beyond the plane of said handle.

5. A tire tool comprising two members pivoted intermediate their ends, each of said members having a jaw, an extensible member longitudinally slidable on said jaw and adapted to increase the length thereof, a knurled shoulder portion integral with said jaw and extending at right angles from one end thereof, and a handle spaced from said jaw and extending from said shoulder portion.

6. A tire tool comprising two members pivoted intermediate their ends, each of said members having a jaw, an extension slidable on said jaw, a knurled portion on one end of said extension, a knurled shoulder portion integral with and extending at right angles from one end of said jaw, and a handle extending from said shoulder portion in a plane parallel to but spaced from said jaw, said shoulder portion having a lip projecting beyond the plane of said handle.

In testimony whereof I affix my signature.

WINSLOW S. PIERCE, Jr.